J. R. RICHARDSON.
Locomotive Wheels.
No. 5,665. Reissued Nov. 18, 1873.
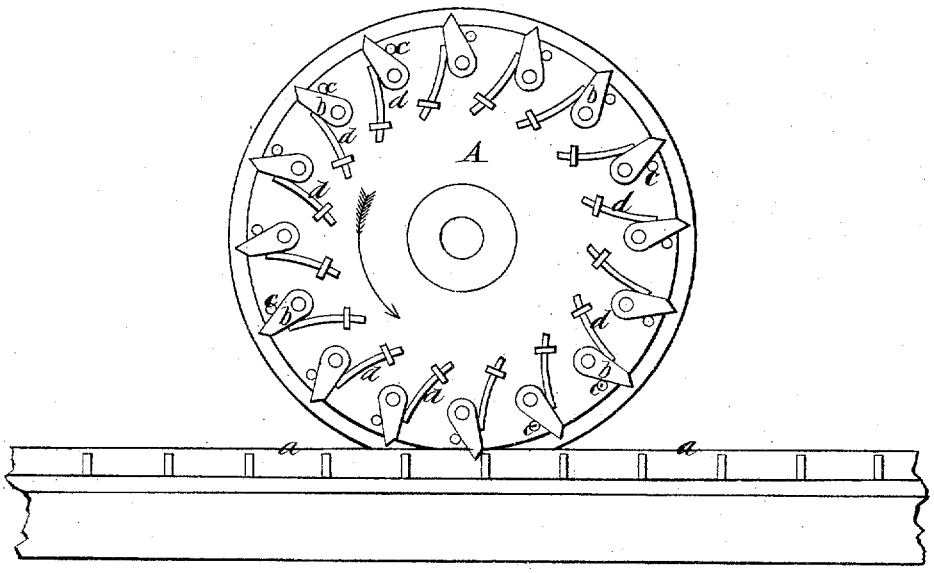
Witnesses.
E. H. Bates
Villette Anderson
Inventor.
Jno. R. Richardson
Chipman & Somers & Co
Attys.
AM. PHOTO-LITHOGRAPHIC Co. N.Y. (OSBORNE'S PROCESS)

UNITED STATES PATENT OFFICE.

JOHN R. RICHARDSON, OF MAX MEADOWS, VIRGINIA.

IMPROVEMENT IN LOCOMOTIVE-WHEELS.

Specification forming part of Letters Patent No. 105,593, dated July 19, 1870; reissue No. 4,721, dated January 23, 1872; reissue No. 5,665, dated November 18, 1873; application filed September 12, 1873.

*To all whom it may concern:*

Be it known that I, JOHN R. RICHARDSON, of Max Meadows, in the county of Wythe and State of Virginia, have invented a new, useful, and valuable Improvement in Devices to Prevent the Wheels of Locomotives from Slipping on the Track; and I do hereby declare the following to be a full, clear, and exact description thereof, reference being had to the accompanying drawings making part of this specification, in which—

Figure 1 is a side elevation, showing my invention.

My invention consists in the combination of a series of pins or teeth arranged about equidistant along the outside of the main track, in combination with a locomotive-wheel provided with a series of projecting spurs, said spurs being combined with springs which press against them with force sufficient to keep the spurs in a position to come in contact with the pins on the rail, and yet allow the spurs to yield vertically if they come in contact with a stone or other obstruction.

In the accompanying drawing, the letter A designates the wheel, and *b b* projecting spurs arranged radially thereon. In the form of wheel shown, *c c* are pins, against which the spurs bear when they come in contact with the track-pins. Springs *d* are arranged so as to keep the spurs in position and still allow them to yield in the event their outside ends come in contact with a stone or other projection.

In the drawing an auxiliary toothed rail has been shown, it being my design to lay such an auxiliary rail outside of the main-track rails which may now be in use. Instead of such auxiliary rail, I may use teeth furnished with shanks, which pass through the rail at its neck and the teeth standing vertically outside of the rail.

I am aware that locomotive driving-wheels have heretofore been constructed with projecting spurs and springs bearing upon a roughened or wooden rail, and this I do not claim broadly; but

Having thus described my invention, what I claim as new, and desire to secure by Letters Patent, is—

The spurs *b*, springs *d*, and pins *e* on a locomotive-wheel, in combination with a track, *a*, having teeth *c*, substantially as set forth.

JOHN R. RICHARDSON.

Witnesses:

JNO. H. SHUFF,

N. P. OGLESBY.